United States Patent

[11] 3,572,833

[72] Inventor George M. Pavliscak
 Inkster, Mich.
[21] Appl. No. 804,882
[22] Filed Mar. 6, 1969
[45] Patented Mar. 30, 1971
[73] Assignee Ford Motor Company
 Dearborn, Mich.

[54] VEHICLE SHOULDER HARNESS ARRANGEMENT
 2 Claims, 3 Drawing Figs.
[52] U.S. Cl. ................................................ 297/389,
 128/94, 128/149, 297/385
[51] Int. Cl. ................................................ B60r 21/10
[50] Field of Search .......................................... 297/385,
 384; 128/94, 149

[56] References Cited
 UNITED STATES PATENTS
 3,258,293 6/1966 Sharp ........................... 297/389
 3,291,528 12/1966 Sencabaugh ................. 297/385
 FOREIGN PATENTS
 239,078 7/1964 Austria ......................... 297/389

Primary Examiner—Bobby R. Gay
Assistant Examiner—James C. Mitchell
Attorneys—E. Dennis O'Connor and John R. Faulkner ABSTRACT: A shoulder harness type occupant restraint arrangement for a motor vehicle including an outboard belt segment having one of its ends secured to vehicle body structure above and behind a forward facing passenger seat. Carried by this belt segment is a collar slidable along the length of the belt segment and adapted to be positioned on that portion of the belt segment that is proximate the neck of a seated passenger. This collar maintains a portion of the belt segment in an arcuate configuration to prevent chafing of the belt edge against the passenger.

PATENTED MAR 30 1971

3,572,833

INVENTOR
George M. Pavliscak
BY John R. Faulkner
E. Dennis O'Connor
ATTORNEYS

3,572,833

VEHICLE SHOULDER HARNESS ARRANGEMENT

BACKGROUND OF THE INVENTION

Conventional motor vehicle shoulder harness restraining arrangements include an outboard belt segment having one of its ends attached to the vehicle roof rail or a body pillar. Because this belt segment is adapted to be positioned diagonally across the torso of a passenger seated on a conventional, forward facing passenger seat, this point of attachment is above the height of the shoulders of the seated passenger. Also, because the shoulder harness must accommodate passengers of various physical dimensions who position their seat at all possible seat positions, this point of attachment must be located behind the vehicle seat when this seat is located in its most rearward point of adjustment.

When in use, the outboard belt segment thus extends from the point of attachment, forward and down to a point proximate the neck of the seated passenger. From the neck of the passenger, the outboard belt segment extends down and across the torso of the passenger.

It readily may be appreciated that such an orientation of the outboard belt segment requires a bend in the belt segment. This bend is located proximate the neck and shoulder junction of the passenger. A bend in the belt segment requires, of course, contact between the belt segment and the passenger. This contact may give rise to an annoying and bothersome chafing of the edge of the flat belt segment webbing against the neck and/or shoulder of the passenger.

While this chafing may not occur to a sufficient degree to prove overly bothersome to a passenger who positions the seat in a more forward position will find the incidence and severity of this chafing quite great. This is because a forward seat position requires a greater bend in the outboard belt segment and thus a greater degree of contact between this segment and the passenger.

It is an object of this invention to provide a vehicle shoulder harness arrangement operative to restrain movement of a vehicle passenger and that may be utilized by a passenger without an incidence of discomfort. In particular, the shoulder harness arrangement of this invention may be used without a chafing of the edge of the outboard belt segment webbing against the neck and/or shoulder of the restrained passenger.

SUMMARY OF THE INVENTION

A shoulder harness arrangement constructed in accordance with this invention is adapted for use in a motor vehicle having body structure defining a passenger compartment and a forward facing passenger seat located within this compartment. The restraining means include an outboard shoulder harness belt segment having one of its ends secured to the body structure above and behind the seat. The belt segment is adapted to be positioned transversely across the torso of a vehicle passenger seated on the seat and to cooperate with an inboard belt segment to limit movement of the passenger. A portion of the outboard belt segment, located intermediate the ends of the segment, is adapted to be positioned proximate the neck of the passenger. Belt shaping means are carried by the outboard belt segment and maintain the outboard belt segment portion proximate the neck of the passenger in an arcuate configuration. This belt shaping means is movable along the length of the outboard belt segment.

DETAILED DESCRIPTION OF THE INVENTION

Figures 1, 2, 3:
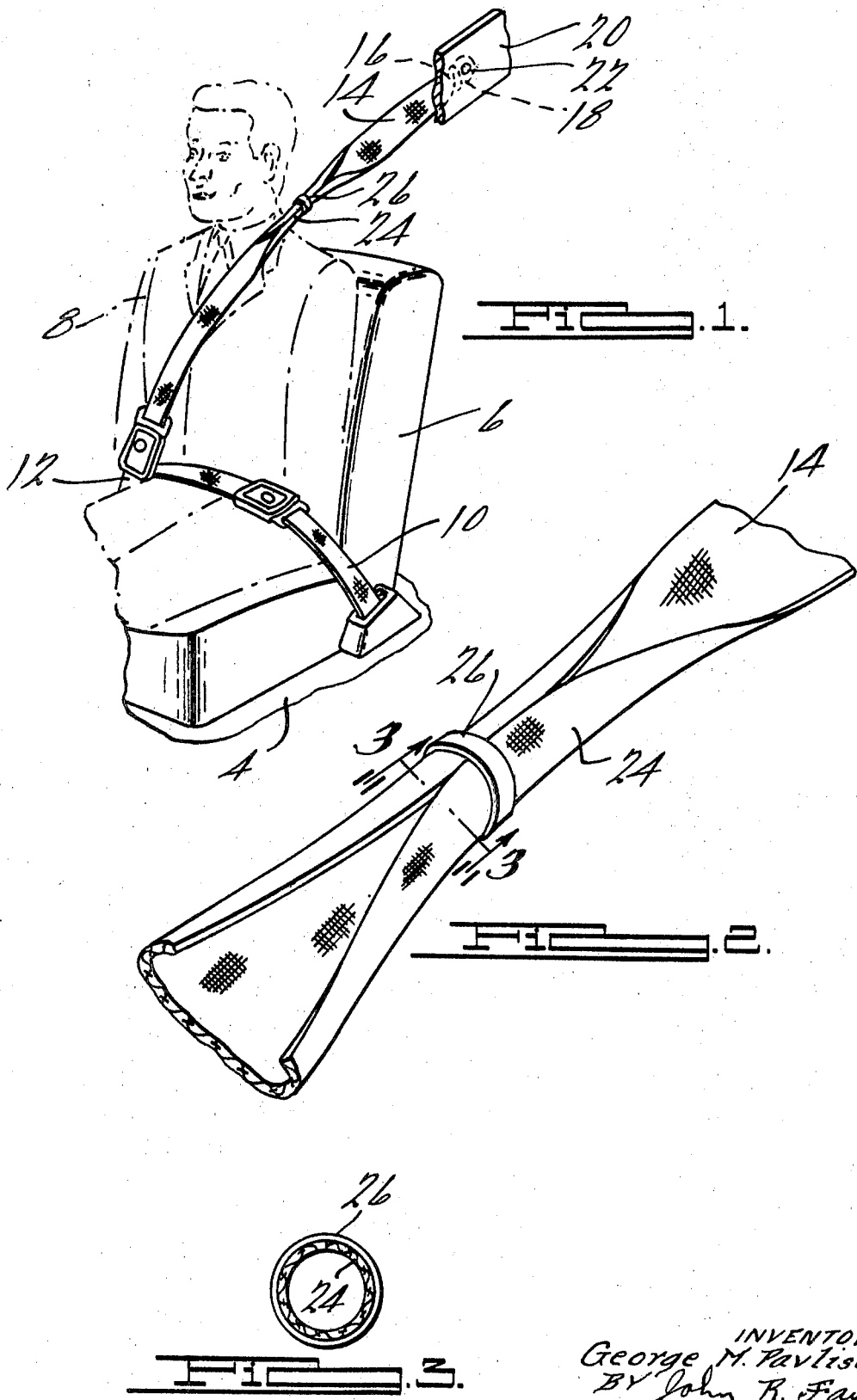
FIG. 1 is a isometric view of a portion of a motor vehicle passenger compartment showing a seated vehicle passenger utilizing the vehicle shoulder harness arrangement of this invention.
FIG. 2 illustrates a portion of the vehicle shoulder harness arrangement of FIG. 1.
FIG. 3 is a view taken along the line 3—3 of FIG. 2.

Referring now to FIG. 1 of the drawings wherein is illustrated a portion of a motor vehicle passenger compartment, the numeral 4 denotes the floor of the passenger compartment. A forward facing passenger seat 6 is secured to floor 4 and is occupied by a passenger 8. The passenger 8 is restrained against movement by conventional motor vehicle passenger restraining means including a lap belt arrangement 10, and a shoulder harness arrangement including an inboard belt segment 12 and an outboard belt segment 14. The shoulder harness belt segments are joined together by conventional buckling means (not considered a part of this invention).

One end 16 of outboard belt segment 14 is secured by a mounting member 18 to the vehicle roof rail 20 such that the effective point of attachment between belt segment 14 and roof rail 20 is at 22. This point of attachment 22 is located rearwardly of the vehicle seat 6 when this seat is positioned in its most rearward point of adjustment. It also may be observed that point of attachment 22 is located vertically above the shoulder height of passenger 8.

It may be appreciated that when shoulder harness belt segment 14 is in the operative position illustrated, this belt segment extends forwardly and down from point of attachment 22 to the neck-shoulder junction of the passenger 8. From this point, segment 14 extends down and across the torso of passenger 8. This orientation of belt segment 14 requires a bend in the segment located near the neck of the passenger 8. This bend can be accomplished, of course, only by contact between the belt segment and the passenger.

Belt segment 14 is formed from conventional vehicle belt webbing having a flat configuration. The requisite contact between this contact and the neck-shoulder junction of passenger 8 frequently occasions a chafing between the edge of the belt webbing and the person of the passenger 8 in conventional shoulder harness arrangements.

Such chafing is prevented in the instant shoulder harness arrangement by the use of belt shaping means comprising a collar 26. Collar 26 is positioned about belt segment 14 prior to the installation of the belt segment in the vehicle. As may be seen from FIGS. 2 and 3, collar 26 has an inside diameter having a circumference substantially equal to the width of belt segment 24. This relationship allows collar 26 to position and maintain a portion 24 of belt segment 14 in a circular configuration.

Collar 26 is slidable along the length of belt segment 14. This slidable characteristic of collar 26 allows the latter to be located such that the belt segment portion 24 that is held in a circular configuration is that portion of belt segment 14 that lies proximate to the neck-shoulder junction of the passenger, regardless of where the passenger positions seat 6.

Contact between arcuate belt segment portion 24 and the person of passenger 8 does not occasion a bothersome or annoying chafing. The rounded configuration of belt segment 24 does not admit to a concentration of contact forces as would contact between the belt edge, having a relatively small surface area, and the person of passenger 8.

I claim:

1. Occupant restraining means adapted for use in a motor vehicle having body structure defining a passenger compartment and a forward facing passenger seat located within said compartment, said restraining means comprising: an outboard shoulder harness belt segment having one of its ends secured to said body structure above and rearwardly of said seat, said belt segment adapted to be positioned transversely across the torso of a vehicle passenger seated on said seat and to cooperate with an inboard belt segment to limit movement of said passenger, a portion of said outboard belt segment located intermediate the ends thereof adapted to be positioned proximate the neck of said passenger, and a collar carried by said outboard belt segment and maintaining said outboard belt segment portion in an arcuate configuration, said outboard belt segment extending through said collar and said collar being movable along the length of said outboard belt segment.

2. The occupant restraining means in accordance with claim 1, wherein said arcuate configuration is circular and wherein said collar is circular and has an inside circumference substantially equal to the width of said outboard belt segment.